US008363115B2

(12) United States Patent
Auberger et al.

(10) Patent No.: US 8,363,115 B2
(45) Date of Patent: Jan. 29, 2013

(54) METHOD AND DEVICE FOR DIGITAL IMAGE STABILIZATION

(75) Inventors: Stephane Auberger, Noisy-le-Grand (FR); Carolina Miro, Saint Cloud (FR); Yann Picard, Caen (FR)

(73) Assignee: NXP, B.V., Eindhoven (NL)

( * ) Notice: Subject to any disclaimer, the term of this patent is extended or adjusted under 35 U.S.C. 154(b) by 718 days.

(21) Appl. No.: 12/063,092

(22) PCT Filed: Aug. 9, 2006

(86) PCT No.: PCT/IB2006/052749
§ 371 (c)(1),
(2), (4) Date: Jul. 23, 2010

(87) PCT Pub. No.: WO2007/017840
PCT Pub. Date: Feb. 15, 2007

(65) Prior Publication Data
US 2011/0037861 A1 Feb. 17, 2011

(30) Foreign Application Priority Data
Aug. 10, 2005 (EP) .................................... 05300659

(51) Int. Cl.
*H04N 5/228* (2006.01)
*G06K 9/00* (2006.01)
(52) U.S. Cl. .................. 348/208.4; 348/208.6; 382/107
(58) Field of Classification Search .. 348/208.4–208.11; 382/107
See application file for complete search history.

(56) References Cited

U.S. PATENT DOCUMENTS

| 5,497,191 A | 3/1996 | Yoo et al. |
| 5,648,815 A | 7/1997 | Toba |
| 5,973,733 A | 10/1999 | Gove |
| 7,024,052 B2 * | 4/2006 | Hirase ........................... 382/281 |
| 7,269,220 B2 * | 9/2007 | Alvarez ................... 375/240.12 |
| 7,705,884 B2 * | 4/2010 | Pinto et al. ............... 348/208.99 |
| 7,880,769 B2 * | 2/2011 | Qi ............................. 348/208.99 |
| 8,155,195 B2 * | 4/2012 | Regunathan et al. ..... 375/240.16 |
| 2004/0012720 A1 * | 1/2004 | Alvarez ........................ 348/607 |
| 2004/0012722 A1 * | 1/2004 | Alvarez ........................ 348/700 |
| 2005/0025243 A1 * | 2/2005 | Sohn et al. ................ 375/240.16 |
| 2005/0275727 A1 * | 12/2005 | Lai et al. .................... 348/208.1 |
| 2007/0002146 A1 * | 1/2007 | Tico et al. .................. 348/208.1 |

FOREIGN PATENT DOCUMENTS
GB 2330269 A 4/1999

OTHER PUBLICATIONS

Litvin, A; et al "Probabilistic Video Stabilization Using Kalman Filtering and Mosiacking" Proceedings of the SPIE, SPIE, Bellingham VA, US, vol. 5022, Jan. 20-24, 2003, pp. 663-674.
Yu-Chun, Peng; et al "Digital Image Stabilization and Its Integration With Video Encoder" Consumer Communications and Networking Conference, 2005. CCNC. 2005 Second IEEE Las Vegas, NV, US Jan. 3-6, 2005, pp. 544-549.

* cited by examiner

*Primary Examiner* — Sinh Tran
*Assistant Examiner* — Christopher K Peterson

(57) ABSTRACT

The invention concerns a method for digital image stabilization for removing jitter from an original sequence of images (10) generated by a camera. The original sequence (10) is applied to a stabilization algorithm (11). The global motion of a camera is estimated and filtered (110) using a default motion filter. Predetermined parameters (13, 140, 141) are extracted from both the original (10) and stabilized (12) sequences of images. A measure value is computed in order to evaluate (15) the stabilization quality and compared to a threshold. Depending on the results of the evaluation ($O_{15}$, $O'_{15}$) the stabilization algorithm (11) uses an alternative filter, in order to improve stabilization quality, or continues to use the default filter.

11 Claims, 3 Drawing Sheets

METHOD AND DEVICE FOR DIGITAL IMAGE STABILIZATION

FIELD OF THE INVENTION

The present invention relates to a method and a device for digital image stabilization for removing unwanted camera movements, called jitter, from an original sequence of images generated by said camera and obtaining a stabilized sequence of images, said original sequence being applied to a stabilization algorithm, in order to remove said jitter.

Such a method and device may be used, for example, in a digital low/mid-end movie camera or in a mobile phone.

BACKGROUND OF THE INVENTION

As well known, the goal of digital image stabilization methods is to remove unwanted camera movement or jitter, thus providing a more pleasant viewing experience, to produce a sequence that displays requisite camera movement only. Jitter is defined as all the undesired positional fluctuation of the image that is added to the intentional motion of the camera, in particular translation and/or rotation.

Stabilization algorithms are sometimes rigid in their processing. It is difficult for these algorithms to be fully suitable to all kinds of input sequences to be stabilized: for example sequences with a single view point, panoramic shots, sequences where the user is moving forward or backward, etc.

The need is thus felt to have a more flexible method, on the one hand, and optimal with many types of input sequences, on the other hand, and a corresponding device.

SUMMARY OF THE INVENTION

It is therefore an object of the invention to propose such a device.

To this end, the invention relates to a device such as defined in the introductory paragraph of the description and which is moreover characterized in that it comprises:
- an initial stage in which a first motion filter having a first set of predetermined characteristics is build, said default filter, and at least one alternative motion filter having a second set of predetermined characteristics, said filters being implemented in said stabilization algorithm;
- a first stage in which a global motion of said camera and in filtering said global motion with said default motion filter is estimated;
- a second stage in which predetermined parameters from both said original and stabilized sequences are extracted and a measure value, said mark is generated, in order of evaluating stabilization quality; and
- a third stage in which said mark is compared to a predetermined threshold and a first control signal is generated if said threshold is exceeded, otherwise a second control signal is generated, said first control signal forcing said stabilization algorithm to use an alternative filter, in order to improve stabilization quality, and said second control signal forcing stabilization algorithm to continue to use said default filter.

It is also an object of the invention to provide a method that can be carried out in such a device.

To this end, the invention relates to a method such as defined in the introductory paragraph of the description and which is moreover characterized in that the method comprises:
- an initial step consisting in building a first motion filter having a first set of predetermined characteristics, said default filter, and at least one alternative motion filter having a second set of predetermined characteristics, said filters being implemented in said stabilization algorithm;
- a first step consisting in estimating a global motion of said camera and in filtering said global motion with said default motion filter,
- a second step consisting in extracting predetermined parameters from both said original and stabilized sequences and generating a measure value, said mark, in order of evaluating stabilization quality; and
- a third step consisting in comparing said mark to a predetermined threshold and generating a first control signal if said threshold is exceeded, otherwise generating a second control signal, said first control signal forcing said stabilization algorithm to use an alternative filter, in order to improve stabilization quality, and said second control signal forcing stabilization algorithm to continue to use said default filter.

In accordance with the most important feature of the method, intrinsic properties of the sequence are used and evaluated in order to improve the stabilisation efficiency.

In practice, to implement the method, an "in loop strategy" is used. The key tool in the loop according to an important feature of the method is the evaluation of some relevant parameters inherent to the sequence which can influence the perception of the stabilization by the user.

To achieve this goal, an original jittered sequence (or a part of) is first stabilized by a default version of the stabilization algorithm. Then global motion and frequency characteristics of the stabilized sequence are taken into account to adapt the thresholds/parameter values in the algorithm to obtain a better stabilization.

The method according to the invention can be applied to any high/low/mid-end digital cameras as a dynamic video stabilization tool, implemented in a mobile phone, Key-ring, a PC program etc.

Other features of the invention are found in the dependent claims.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

In the following description, well-known functions or constructions by the person skilled in the art are not described in detail since they would obscure the invention in unnecessary detail.

To fix the ideas, without limiting the scope of the invention, it will be considered hereafter that jittered images are generated by a movie camera (not shown). Both original and stabilized sequences of images can be stored in memory means, modules 10 and 12.

Figure 1:
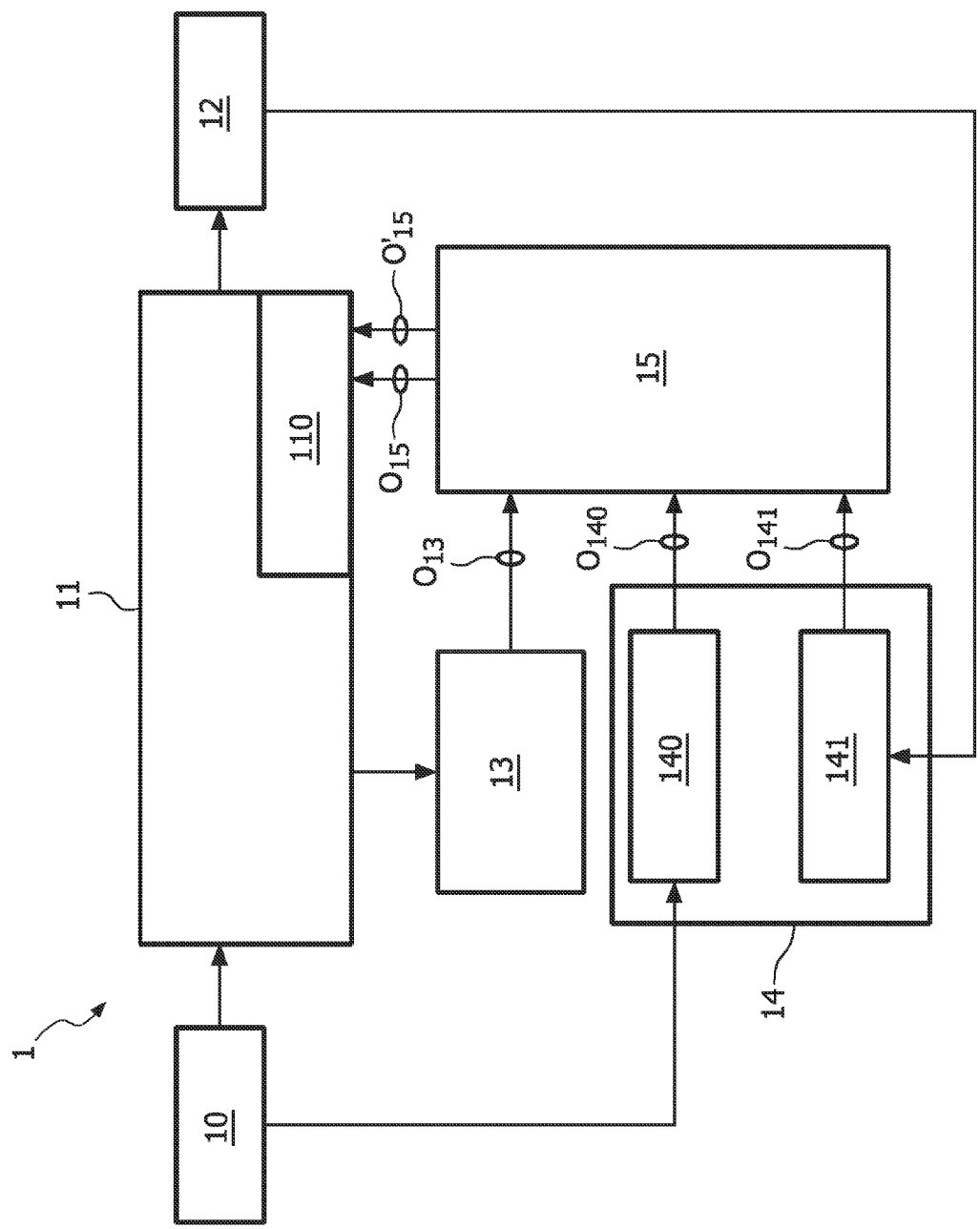
FIG. 1 schematically illustrates the architecture of a system implementing the method of digital image stabilization according to a preferred embodiment of the invention.

FIG. 1 schematically illustrates the architecture of a system 1 implementing the method of digital image stabilization (DIS) according to the invention (with an aim of simplification, the method of digital image stabilization will be called hereafter "DIS").

A module 11 implements a stabilization algorithm and handles also the implementation of stabilization algorithm filters (module 110), which will be detailed hereafter.

The stabilization algorithm module 11 creates a stabilized sequence 12 from the original, i.e. jittered sequence 10 generated by the camera. The images can be divided in large areas of pixels called "macro blocks". Some relevant sequence parameters coming from the stabilization algorithm module 11, such as global motion vectors, hereafter called "GMVs", or motion vectors per macro block, hereafter called "BMVs", are sent to a sequence parameter module 13 and stored therein. Then, they are sent to an evaluation module 15 (output $O_{13}$) and evaluated (the different circuits of the evaluation module 15 will be detailed in FIG. 2). Depending on the results of this evaluation, new thresholds of the stabilization algorithm are adjusted to better stabilize the original sequence.

The analysis performed in the evaluation module 15 leads to an objective measure of the video stabilization quality, by using measurements of different natures (on both original 10 and stabilized 12 image sequences): the well-known parameter called "peak signal-to-noise ratio" or "PSNR" of consecutive images, a frequency analysis of the motion vectors along the sequence and the analysis of the motion parameters of the current image. This operation is performed for each frame and is detailed hereafter. Based on this evaluation, the stabilisation parameters of the algorithm are dynamically adjusted (for each frame or for a group of N frames). The possible adjustments of the motion/jitter filtering part of the stabilization algorithm and the relationship between the evaluated parameters and the interaction on the stabilisation algorithm will be also detailed later.

The evaluation module 15 will now be described with respect to detailed FIG. 2. As already noted, the analysis is performed in the evaluation module 15, leading to an objective measure of the video stabilization quality, by using measurements of different natures (on both original 10 and stabilized 12 image sequences): the "PSNR" of consecutive images, and a frequency analysis of the "GMVs" along the sequence.

A module 14 (see FIG. 1) comprises memory means to store N frames. More particularly, it comprises an original buffer 140 to store frames from the original sequence of images 10 and a stabilized buffer 141 to store N frames from the stabilized sequence of images 12. Said sequences of N frames are sent to the evaluation module 15 (outputs $O_{140}$ and $O_{141}$, respectively), and, more particularly to an analysis block 16 provided in said module 15.

Several measures are combined to create a "Stabilization Quality Metric", hereafter called "SQM", using a combination of parameters based on the motion-frequency content of the original sequence 10 and the stabilized sequence of images 12, perceptual considerations and a regular mean "Inter-frame Transformation Fidelity measure".

More particularly, in accordance with a preferred embodiment of the method of the invention "Objective video Stabilization quality measure system", "SQM" is measured as follows.

The motion spectrum, based on consecutive "GMVs" values, is divided into two energy bands, one for high frequencies, typically above 1 Hz, and one for low frequencies, below 1 Hz (in that example).

Thus the estimation of the quality of stabilization called Estimation_of_Stabilisation_Quality, is given by the following equation:

$$\text{Estimation\_of\_Stabilisation\_Quality} = (\alpha 0 + \alpha 1 * A_{Below} + \alpha 2 * A_{Above}) * ITF + (\alpha 0 + \beta 1 * A_{Below} + \beta 2 * A_{Above}) * redHF + (\gamma 0 + \gamma 1 * A_{Below} + \gamma 2 * A_{Above}) * redLF \quad (1)$$

where α1 and α2 represent the respective importance of $A_{below}$ and $A_{above}$ in the way they ponder the Inter-frame Transformation Fidelity (ITF) and α0 represents the overall importance of the ITF as such in the total measure; β1 and β2 represent the respective importance of $A_{below}$ and $A_{above}$ in the way they ponder the high frequency reduction (redHF) and β0 represents the overall importance of redHF as such in the total measure; and γ1 and γ2 represent the respective importance of $A_{below}$ and $A_{above}$ in the way they ponder the low frequency reduction (redLF) and γ0 represents the overall importance of redLF as such in the total measure, respectively. These parameters are experimentally determined.

The other parameters are detailed hereafter:

$A_{above}$ and $A_{below}$ represent the proportion of the energy in both bands (above/below, for example, 1 Hz respectively) compared to the total motion energy; and HF_Energy, and LF_Energy are the absolute levels of high and low frequencies energy.

Said parameters are given by the two following equations:

$$A_{Above} = \frac{HF\_Energy}{HF\_Energy + LF\_ENERGY}, \quad (2)$$

$$A_{Below} = \frac{LF\_Energy}{HF\_Energy + LF\_ENERGY} = 1 - A_{Above} \quad (3)$$

RedHF and RedLF represent the reduction of motion energy between original 10 and stabilized 12 sequences over the considered two frequency bands. This should be a primary indicator for jitter reduction, particularly over high frequencies.

ITF represents an index, which is a standard "PSNR" computed on the luminance data between two consecutive frames. The final index is averaged over the whole sliding test window (or whole sequence in the case of sequence-wise measurements).

Equation (4) recalls the expression of the "PNSR" between consecutive frames:

$$PSNR = 10 \cdot \log_{10} \frac{255^2}{\frac{1}{\#\text{pixels}} \sum_{ij} (a_{ij} - b_{ij})^2} \quad (4)$$

where $a_{ij}$ and $b_{ij}$ are the correspondent pixels of the current and consecutive frames.

The "Inter-frame Transformation Fidelity" or "ITF" measure is calculated from "PSNR" between consecutive images of the sequence (PSNR ($I_k$, $I_{k+1}$)), k being an arbitrary rank.

ITF index is given by equation (5):

$$ITF = \frac{1}{(nb\_frame - 1)} \sum_{K=1}^{nb\_frame-1} (PSNR(I_K, I_{K+1})) \quad (5)$$

where nb_frame represents the number of frames of the tested part of the sequence.

The above recalled parameters are computed in the analysis block 16 (FIG. 2), taking into account the sequence parameters received from module 13 (FIG. 1: output $O_{13}$), the original frames received from Original Buffer 140 (output $O_{140}$) and Stabilized Buffer (output $O_{141}$). Said parameters are stored in memory means 160 (ITF), 161 (RedHF), 162 (RedLH), 163 ($A_{above}$) and 164 ($A_{below}$). The contents of the above-mentioned memory means are sent to a measure computation module 17.

Now, the stabilization algorithm implemented in the module 11 of FIG. 1 will be detailed. A stabilization algorithm usually first estimates the global camera motion from one frame to the next, leading to a "Global Motion Vector" or "GMV". Then this motion needs to be filtered in order to remove its undesirable component or jitter. Such a component must be separated from intentional motion. Basically, by taking the absolute displacement vector values over the sequence and applying a low-pass filtering, the high frequency jitter will be removed, preserving the general trend.

According to a feature of the invention, two first filters are used, called hereafter filters $FILTER_A$ and $FILTER_B$, respectively. During a low-pass "GMV" filtering stage, the "GMV" curve is filtered and accumulated through time over n frames. The correction to be applied is the difference between the original accumulated curve AMV(n):

$$AMV(n) = SUM(k=1 \text{ to } n)*(GMV(k)) \quad (6)$$

and a modified accumulated curve AMVmod(n):

$$AMVmod(n) = SUM(k=1 \text{ to } n)(filter(GMV(k))) \quad (7).$$

Two moving average filtering modes are possible.

With filter $FILTER_A$, a moving average filtering at time t is performed. The

"GMV" is replaced by an average of the M previous "GMVs", thus filtering the high frequency component of the "GMV" as follows:

$$GMVfilt_t = Average(GMV_t \ldots GMV_{t-M}) \quad (8)$$

With filter $FILTER_B$, a double pass moving average filtering at time t is performed: The moving average-filtered "GMV", $GMV\_filt_t$, is once again averaged over the same sampling window:

$$GMV\_double\_filt_t = Average(GMV\_filt_t \ldots GMV\_filt_{t-M}) \quad (9).$$

This doubly filtered "GMV" will provide an even smoother result than a simple moving average filtering.

Then "Motion Vector Integration" provides the basis for two other motion filters, hereafter $FILTER_C$ and $FILTER_D$. In this case, the "GMV" is integrated with a damping factor, and the integrated motion vector ("IMV") thus generated designates the final motion vector correction to be applied to the current input image to construct the stabilized sequence:

$$IMV_t = \alpha * IMV_{t-1} + GMV_t \quad (10)$$

where α is a damping factor <1 (it is chosen between 0 and 1, depending on the degree of stabilization desired).

According to a feature of the method of the invention, an adaptive damping coefficient α is used in such a way that the following equation is satisfied.

$$IMV_t = \alpha_{(GMVt+GMVt-1)} * IMV_{t-1} + GMV_t \quad (11)$$

The damping factor α depends on the sum of the last two "GMVs". This allows tracking the beginning of intentional motion. The correspondence table between α and ($GMV_t + GMV_{t-1}$) is built as follows:

Low sum of "GMV" value implies high damping factor value. High damping value strongly stabilizes the sequence, as if assuming static intentional camera.

High sum of "GMV" value implies low damping factor value, as low damping value makes the sequence more follow the original motion.

Two tables are used:

$FILTER_C$: in the case, the correspondence table is constructed so that the stabilized sequence tries to stabilize as much as possible the original motion. The table is filled, in general, with high damping factor values.

$FILTER_D$: in the case, the correspondence table is constructed so that the stabilized sequence allows a faster tracking of large intentional motion (the table is filled with slightly lower damping factor values than in filter C).

The loop interaction will be now explained in detail.

The default "Motion Filtering" filter used in the stabilization algorithm is $FILTER_C$. Depending on the Evaluation results, the stabilization algorithm can use different motion filters.

Figure 2:
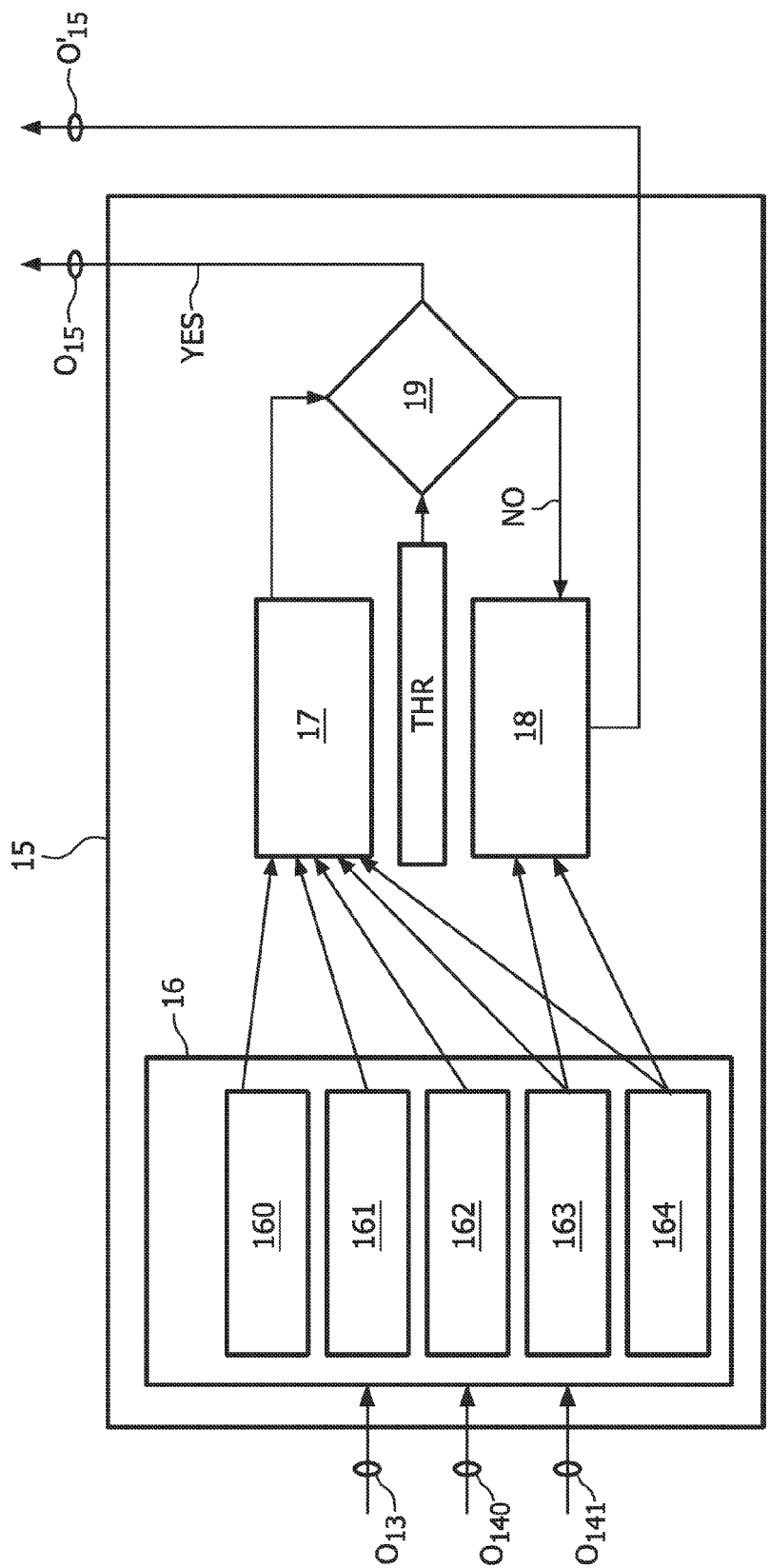
FIG. 2 schematically illustrates in a more detailed manner one module of FIG. 1, called "Evaluation Module"

First, the stabilized sequence is given a measure or mark, by the evaluation module 15, more precisely by the analysis block module 16 (FIG. 2). Said measure is computed by a measure computation module 17, which receives the parameters ITF, etc., from module 160 to 164, as already explained. The output of the measure computation module 17 is sent to a comparison module 19 to be compared to a predetermined threshold THR. If the measure is above the limit threshold THR, it means that the stabilization results are satisfying and no change is required: branch "YES" and the signal on a first output, $O_{15}$, is sent to a filter sub-module 110 located in the stabilization algorithm module 11.

Otherwise, the sequence will be processed using another filter: branch "NO". The signal on a second output of the comparing module 19 is sent back to a filter action analysis module 18, which also receives parameters $A_{above}$ and $A_{below}$.

The switching process is as follows:

If $A_{below} > T1 * A_{above}$ then the filters $FILTER_A$ or $FILTER_B$ are used:

If $A_{above} > T2$, filter $FILTER_B$ is used, otherwise, filter $FILTER_A$ is used If $A_{below} < T1 * A_{above}$ then the $FILTER_C$ or $FILTER_D$ filters are used:

If $A_{above} > T3$, use $FILTER_C$, otherwise, use $FILTER_D$ where T1, T2 and T3 are thresholds which are experimentally determined.

The result of the above computations is sent to the filter control module 110: signal on output $O'_{15}$ with a predetermined format, called "Send_Filter_Action message".

Then, the stabilization algorithm module 11 filters the global camera motion taking into account either the value of signal received from output $O_{15}$, either the value of signal received from output $O'_{15}$ of the evaluation module 15, and rejects undesirable jitter.

Thus, according to the most important feature of the method of the invention, said rejection is done by using the intrinsic properties of the sequence of images and evaluating them in order to improve the stabilization.

Figure 3:
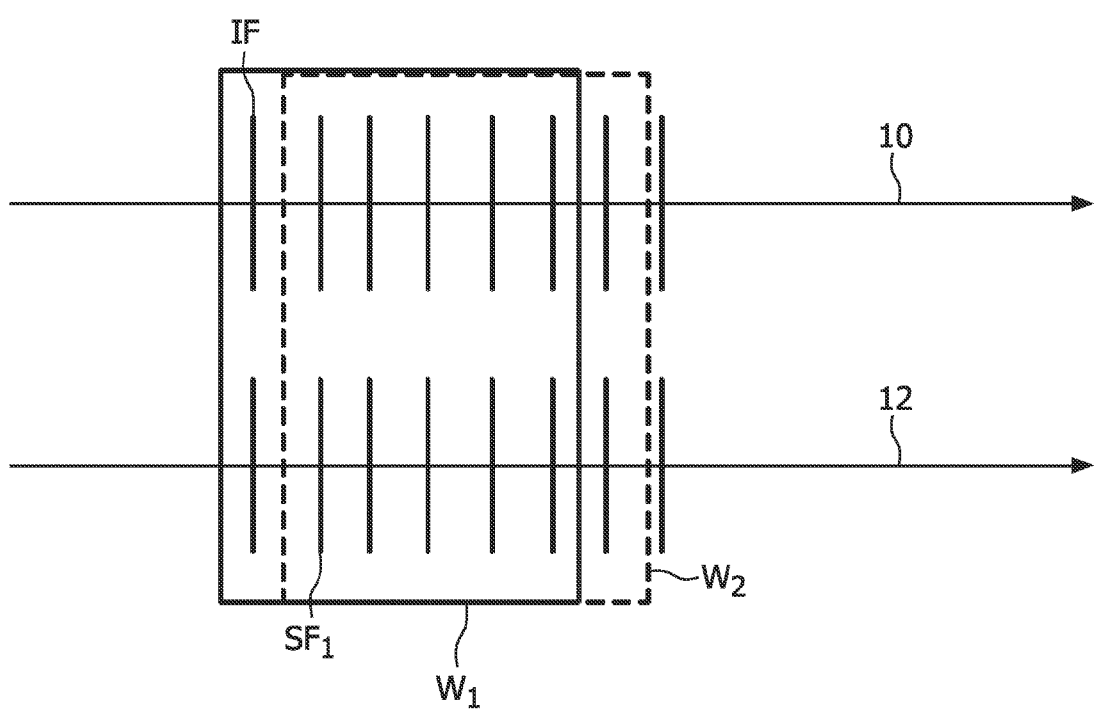
FIG. 3 is a time diagram illustrating the optimal usage of the loop in the invention.

The optimal use of the invention is to realize the loop interaction using a closed loop. FIG. 3 is a time diagram explaining said optimal use. The loop-interaction is done dynamically, using a closed loop, i.e. with a measurement based on a predetermined number of consecutive frames (six in the case illustrated in FIG. 3) called "stabilization efficiency measurement sliding windows" $W_i$ (i being an arbitrary rank). The upper line represents the frames of the original sequence of images and the lower line represents the frames of the stabilized sequence of images.

The initialization frame is referenced IF (upper line) and the first stabilized frame is referenced $SF_1$ (lower line). The first window is referenced $W_1$. For any frame of this window, there are not yet enough processed frames to achieve a correct in-loop stabilization control. From the last frame F of the second window, referenced $W_2$ (dotted lines in FIG. 3), the analysis window is filled, thus the in-loop stabilization becomes active.

Each window comprises the same number of time slots (each time slot corresponding to a time interval between two consecutive frames), i.e. a same number of frames, but shifts with the time, from one generated frame to the next one. For example, window $W_1$ comprises original frames number 1 (IF) to 6, and stabilized frames 1 to 6, window $W_2$ comprises original and stabilized frames number 2 to 7 (F) etc.

The above-described mechanism allows changing in real-time the motion filtering part of the stabilization algorithm implemented in module 11 (FIG. 1). Within sight of preceding description, it is clear that the invention achieves well the goals which it set. The DIS method in accordance with the invention is particularly interesting when applied to low/mid-end digital video cameras as a dynamic video stabilization tool, but it can be built in a mobile phone, a Key-ring, a PC program, etc.

However, it is to be understood that the present invention is not limited to the aforementioned embodiments and variations expressly described, and modifications may be made without departing from the spirit and scope of the invention. There are indeed numerous ways of implementing functions of the method according to the invention by means of items of hardware or software, or both, provided that a single item of hardware or software can carry out several functions. It does not exclude that an assembly of items of hardware or software or both carry out a function, thus forming a single function without modifying the DIS method in accordance with the invention. Said hardware or software items can be implemented in several manners, such as by means of wired electronic circuits or by means of an integrated circuit that is suitable programmed respectively.

The invention claimed is:

1. A device for digital image stabilization for removing unwanted camera movements, called jitter, from an original sequence of images generated by said camera and obtaining a stabilized sequence of images, said original sequence being applied to a stabilization algorithm module, in order to remove said jitter, said device comprising: an initial stage with a first motion filter having a first set of predetermined characteristics, a default filter, and at least one alternative motion filter having a second set of predetermined characteristics, said filters being implemented in said stabilization algorithm; a first stage in which a global motion of said camera and filtering said global motion with said default motion filter is estimated; a second stage in which predetermined parameters from both said original and stabilized sequences are extracted and a measure value, called a mark, is generated, in order of evaluating stabilization quality; and a third stage in which said mark is compared to a predetermined threshold and a first control signal is generated if said threshold is exceeded, otherwise a second control signal is generated, said first control signal forcing said stabilization algorithm module to use an alternative filter, in order to improve stabilization quality, and said second control signal forcing stabilization algorithm to continue to use said default filter.

2. A method for digital image stabilization for removing unwanted camera movements, called jitter, from an original sequence of images generated by said camera and obtaining a stabilized sequence of images, said original sequence being applied to a stabilization algorithm module, in order to remove said jitter, the method comprising: an initial step of building a first motion filter having a first set of predetermined characteristics, a default filter, and at least one alternative motion filter having a second set of predetermined characteristics, said filters being implemented in said stabilization algorithm module; a first step of estimating a global motion of said camera and in filtering said global motion with said default motion filter, a second step of extracting predetermined parameters from both said original and stabilized sequences and generating a measure value, said mark, in order of evaluating stabilization quality; and a third step of comparing said mark to a predetermined threshold and generating a first control signal if said threshold is exceeded, otherwise generating a second control signal, said first control signal forcing said stabilization algorithm module to use an alternative filter, in order to improve stabilization quality, and said second control signal forcing said stabilization algorithm module to continue to use said default filter.

3. A method as claimed in claim 2, characterized in that, said images being divided in predetermined large areas of pixels, called "macro blocks", said parameters comprise global motion vectors and "macro blocks" vectors.

4. A method as claimed in claim 3, characterized in that said mark comprises a stabilization quality metric based on a combination of measures made on both said original and stabilized sequences, said measures comprising at least a peak signal-to-noise ratio of consecutive images and a frequency analysis of said global motion vectors along a sequence of predetermined number of images, said measures being performed on both said original and stabilized sequences of images.

5. A method as claimed in claim 4, comprising a step comprising dividing the motion spectrum of said sequence of predetermined number of images in two predetermined energy bands, a first energy band of low frequencies and a second energy band of high frequencies, in that said motion spectrum is computed from consecutive global motion vectors, and in that said stabilization quality metric is based on the computation and the combination of first and second parameters, called $A_{f_e l_{ow}}$ and $A_{above}$, respectively, representing the proportion of energy in said first and second energy band, respectively, of third and fourth parameters representing the reduction of motion energy between said original and stabilized sequences of images over said first and second frequency bands, and a fifth parameter, called inter-frame transformation fidelity, representing said peak signal-to-noise ratio between consecutive images of said sequence of predetermined number of images.

6. A method as claimed in claim 5, characterized in that said high frequencies are the frequencies above 1 Hz and said low frequencies are the frequencies under 1 Hz.

7. A method as claimed in claim 5, characterized in that said first set of characteristics of the default motion filter, called $FILTER_c$, is designed in order to obtain a high stabilization of the motion of said camera, and comprises a correspondence table filled with high damping factor value.

8. A method as claimed in claim 7, characterized in that said second set of characteristics of at least one alternative filter, called $FILTER_0$, is designed in order to allow a faster tracking of large intentional motion of said camera, and comprises a correspondence table filled with damping factors whose value are lower than the values of the damping factors of said $FILTER_c$.

9. A method as claimed in claim 5, in which said initial step comprises the building of two further alternative motion filters having third and fourth set of characteristics, called FILTER$_A$ and FILTER$_B$, respectively, in that said third set of characteristics are so designed that a moving average filtering is performed on said original sequence of images, said global moving vectors being replaced by an average of a predetermined number of previous global moving vectors, representing a sampling window, and high frequencies components of said vectors being filtered, and in that said fourth set of characteristics are so designed that a double-pass moving average filtering is performed on said original sequence of images, said global moving vectors being replaced by an average of a predetermined number of previous global moving vectors and high frequencies components of said vectors being filtered during a first pass, the so-filtered moving vectors being filtered again over the same sampling window, during a second pass.

10. A method as claimed in claim 9, in which, said initial step comprises the experimental determination of three further thresholds, called T\, Tôand T$_3$, respectively, and in that, if said first threshold is exceeded, it comprises a further step of successive comparisons, using said first and second parameters, A$_{below}$ and Aabove, respectively:

If A$_{below}$ >71 * A$_{above}$ then said filters FILTER$_A$ or FILTER$_B$ are used, and If A$_{bove}$ >TI, then said filter FILTER$_B$ is used, otherwise said filter FILTER$_A$ is used; and If Abeiow <T\* A$_{above}$ then the FILTERc or FILTERc filters are used, and If Aabove >TI, then said FILTERc is used, otherwise said FILTER$_0$ is used.

11. A method as claimed in claim 10, characterized in that said sampling window is a sliding window comprising a constant number of time slots, each time slot corresponding to an interval of time separating two successive frames of both said original and stabilized sequence, said sliding window shifting with the time from one frame to the next one, in order to perform said motion filtering in real time.

* * * * *